United States Patent Office 2,714,599
Patented Aug. 2, 1955

2,714,599

OXIDATION OF 3-HYDROXYSTEROIDS

Gunther S. Fonken, Kalamazoo, Robert H. Levin, Kalamazoo Township, Kalamazoo County, and A Vern McIntosh, Jr., Kalamazoo, Mich., assignors to The Upjohn Company, Kalamazoo, Mich., a corporation of Michigan No Drawing. Application July 16, 1952,
Serial No. 299,232

20 Claims. (Cl. 260—397.45)

This invention relates to a chemical process for the production of ketosteroids and is more particularly concerned with a novel process for the oxidation of secondary-hydroxysteroids to corresponding ketosteroids using an organic hypochlorite, especially an alkyl hypochlorite. The oxidation of 3-hydroxysteroids to 3-ketosteroids is a particularly preferred embodiment of the present invention.

It is an object of the present invention to provide a novel process for the oxidation of secondary-hydroxysteroids to ketosteroids. Another object is the provision of a process for the conversion of 3-hydroxysteroids to 3-ketosteroids in high yields and with a minimum of side reactions. Other objects will be apparent to those skilled in the art to which this invention pertains.

The ketosteroids, and in particular the 3-ketosteroids, which are produced as products of the present invention are valuable precursors to physiologically active steroids. 3α,17α-dihydroxy-21-acetoxypregnane-11,20-dione, for example, when following the method of the present invention, can be quantitatively oxidized to 17α-hydroxy-21-acetoxypregnane-3,11,20-trione which can thereafter be brominated at the 4-position and thereafter dehydrohalogenated according to methods well-known in the art to produce cortisone acetate. Since most physiologically active hormone and hormone-like steroids possess keto groups, and in particular a 3-keto group, a process which produces keto groups, and in particular a 3-keto group, in high yield without extensive manipulation and without the necessity of carefully controlled conditions is of considerable industrial importance. Moreover, that the process of the present invention can be conveniently performed at about room temperature adds to the convenience and simplicity of the process and is therefore an added advantage. Furthermore, the fact that an excess of alkyl hypochlorite is not disadvantageous, rather preferred, renders the process particularly valuable since it is well-known that reactions usually proceed readily to completion and give higher yields of product when an excess of a reactant can be employed. Other advantages and uses will be apparent to those skilled in the art to which this invention pertains.

The preferred secondary-hydroxysteroids used as starting compounds in the method of the present invention are 3-hydroxysteroids which are saturated (i. e., carbon to carbon double and triple-bonds are not present), and which do not have unsubstituted primary or secondary-hydroxy groups other than the 3-hydroxy group since these unsaturated linkages and hydroxy groups, which also usually react with alkyl hypochlorites, sometimes unduly complicate the reaction. Steroids of the above type, but containing, in addition, an 11α(or β)-hydroxy group, are also included as preferred starting compounds since the 11α-hydroxy group is substantially non-reactive with hypochlorites, and the 11β-hydroxyl group is smoothly converted to an 11-keto group by using an additional quantity of the alkyl hypochlorite. This delineation of preferred starting compounds, however, is not to be construed as limiting the scope of this invention, as numerous other secondary-hydroxysteroids are converted to ketosteroids by the process of this invention and are also included as starting materials within the scope of this invention. If additional groups such as, for example, unsaturated linkages or other hydroxy groups, or other groupings, are present which are reactive with the alkyl hypochlorite under the conditions of the reaction, an additional amount of the alkyl hydrochlorite may be included in the reaction mixture to react with these additional groups. Alternatively these additional reactive groups in the starting compounds may be protected and later regenerated in the product obtained by the process of the present invention, for example, carbon to carbon double-bonds may be protected by adding two bromine atoms and later regenerated by treating with zinc. Additional hydroxy groups may be protected, for example, by selective ester or ether formation and later regenerated by hydrolysis.

Of the preferred starting steroids, steroids of particular interest are those having the following structural formula:

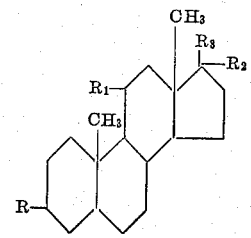

wherein R is α-hydroxy or β-hydroxy; R₁ is hydrogen, α-hydroxy or an acyloxy ester thereof such as, for example, formyloxy, acetoxy, benzoyloxy, propionyloxy, butyryloxy, valeryloxy, hexanoyloxy, phenylacetoxy, octanoyloxy, or the like, especially lower alkanoyloxy, or β-hydroxy, or ketonic oxygen; R₂ is hydrogen or hydroxy; and R₃ is acetyl, acyloxyacetyl, e. g., acetoxyacetyl propionoxyacetyl, butyryloxyacetyl, octanoyloxyacetyl, benzoyloxyacetyl, or the like, especially acyloxyacetyl wherein the acyloxy group is a lower-alkanoyloxy group, or haloacetyl, e. g., bromoacetyl, chloroacetyl, or the like.

According to the method of the present invention, a secondary-hydroxysteroid, preferably a 3-hydroxysteroid is contacted under substantially anhydrous conditions, with an organic hypochlorite, preferably with an alkyl hypochlorite.

In carrying out the process of the present invention, a secondary-hydroxysteroid, preferably a 3-hydroxysteroid is contacted, under substantially anhydrous conditions, with an alkyl hypochlorite. The reaction is usually conducted in the presence of a solvent such as, for example, tertiary-butyl alcohol, tertiary-amyl alcohol, chloroform, or the like, the concept, definition, and use of a solvent being well-known in the art. The temperature employed is usually between about minus twenty and about plus fifty degrees centigrade, ordinarily at about room temperature, e. g., between about twenty and about thirty degrees centigrade, for a reaction period of between about ten minutes and about twenty-four hours, the exact reaction period required for complete reaction being in part dependent upon the reaction temperature and the alkyl hypochlorite employed and the molar ratio thereof to starting steroid, as well as other factors apparent to one skilled in the art. The amount of water present in the reaction mixture should be less than 0.5 per cent by weight and preferably less than 0.1 per cent by weight.

Although the use of organic hypochlorites generally is within the purview of the present invention, alkyl hypochlorites are usually used. The secondary-alkyl hypochlorites are relatively unstable and for this reason are not the preferred hypochlorites. Since methyl hypochlorite is very unstable and even explosive at room temperature, it is preferably not employed in carrying out the process of the present invention. Tertiary-alkyl hypochlorites are very desirable oxidizing agents when following the method of the present invention and, of these, tertiary-butyl hypochlorite has been found to be particularly satisfactory, being quite stable and enabling frequent procurement of practically quantitative yields of the desired ketosteroid. Tertiary-butyl hypochlorite is therefore a preferred alkyl hypochlorite.

The amount of alkyl hypochlorite used is generally between about one and about five moles, or more, per mole of steroid in order to convert a secondary-hydroxy group to a keto group in the process of this invention. Best yields appear to be obtained when the alkyl hypochlorite is employed in a molar ratio to starting secondary-hydroxysteroid of about two to one and preferably from about three to about four moles of alkyl hypochlorite to one mole of starting steroid since the large molar excess appears to enhance the yield of product. However, if an additional group which reacts with the alkyl hypochlorite is present, the amount of alkyl hypochlorite used should be at least about one mole plus the amount required to react with the additional group, preferably between about three and about four times this combined amount, per mole of starting steroid.

If desired, the reaction may be performed in the presence of an acid-binding agent, for example, a base such as pyridine, or other acid-binding agent, which is essentially non-reactive with the alkyl hypochlorite, the starting steroid, and the steroid product. In converting a secondary-hydroxy group to a keto group, for example, about one mole of the acid-binding agent pyridine is used per mole of starting steroid. However, the inclusion of an acid-binding agent is usually unnecessary to obtain high yields of desired product. In some instances the amount of excess alkyl hypochlorite used may be reduced without loss in yield if an acid-binding agent is included.

While considerably broader ranges of reaction temperature, e. g., between about minus twenty and about plus fifty degrees centigrade, are included within the scope of the present invention, the preferred reaction temperature is room temperature, e. g., between about twenty and about thirty degrees centigrade, as high yields of desired product are obtained within this temperature range and external cooling or heating is usually unnecessary. Sometimes, however, a reaction temperature slightly below room temperature will enhance the yield of desired product when the oxidation of a particular starting secondary-hydroxysteroid is unduly accompanied by side reactions. Usually reaction temperatures substantially above room temperature are not preferred. In general, the preferred reaction temperature, while usually room temperature, varies somewhat with the starting steroid and the alkyl hypochlorite employed. Temperatures substantially below minus twenty and substantially above plus fifty degrees centigrade are operative in certain instances. If α-chlorination of a keto group is a significant side reaction, it is usually preferred to conduct the reaction in the absence of light in order to obtain maximum yields of the unchlorinated ketosteroid. If, instead, it is desired to obtain α-chlorination, the reaction may be conducted in the presence of light and in some instances illumination may be preferred.

Tertiary alkanols have been found to be excellent reaction solvents and anhydrous tertiary-butyl alcohol, a preferred solvent, has been used with repeated success. Other solvents such as, for example, tertiary-amyl alcohol, chloroform, ethylene dichloride, pentane, hexane, and the like, are also suitable. The choice of reaction solvent depends in part on the solubility of the starting steroid in the solvent.

The progress of the oxidation can conveniently be followed by iodometric titration, according to methods known in the art, of aliquot samples taken from time to time from the reaction mixture. When consumption of alkyl hypochlorite has essentially ceased or when the theoretical amount has been consumed, the reaction is usually complete and further reaction time is unnecessary.

Isolation of the product of the present invention is conveniently achieved, for example, by distilling the volatile components of the reaction mixture at reduced pressure and, if an acid-binding agent is used, washing the residue with water. The resulting residue consists of a very high, and frequently quantitative, yield og ketosteroid in a high state of purity. If a significant amount of corresponding α-chloroketosteroid is present and it is desired to obtain pure unchlorinated product, a simple purification comprises dissolving this residue in acetic acid and treating the solution with zinc dust which removes this chlorine thereby purifying the desired ketosteroid. Alternatively, the residue can be crystallized from an organic solvent according to methods well-known in the art.

The following examples are illustrative of the process and products of the present invention but are not to be construed as limiting.

PREPARATION 1.—3α,17α-DIHYDROXYPREGNANE-11,20-DIONE 20-ETHYLENE GLYCOL KETAL

A mixture of 260 milligrams of 3α,17α-dihydroxypregnane-11,20-dione [Kritchevsky, Garmaise, and Gallagher, J. Am. Chem. Soc., 74, 483 (1952)], five milliliters of ethylene glycol, fifty milligrams of para-toluenesulfonic acid monohydrate and 100 milliliters of benzene was placed in a reaction flask which was equipped with a reflux condenser and a water trap so arranged that the condensed vapors passed through the water trap before returning to the reaction flask. The mixture was heated to reflux and was allowed to reflux for five hours while at the same time being agitated. The water which formed was removed by co-distillation with benzene and was collected in the water trap. The reaction mixture was cooled and poured into a dilute solution of sodium bicarbonate. The benzene layer was separated, washed with water, dried and concentrated to dryness. The residue was chromatographed over forty grams of Florisil magnesium silicate using eighty-milliliter portions of a mixture of ethylene dichloride with successively greater proportions of acetone for elution. The material, which was eluted with ethylene dichloride-acetone (12:1 and 8:1), weighed 141 milligrams after removal of the solvents. Recrystallization from benzene-Skelly Solve B gave fifty milligrams of 3α,17α-dihydroxypregnane-11,20-dione 20-ethylene glycol ketal melting at 144 to 146 degrees centigrade.

Analysis:
Calculated for $C_{23}H_{36}O_5$ _____ C, 70.37; H, 9.25
Found _____ C, 70.65; H, 9.28

PREPARATION 2.—3α,11α,17α-TRIHYDROXYPREGNAN-20-ONE AND 3α,11β,17α-TRIHYDOXPREGNAN-20-ONE

To a solution of two grams of lithium aluminum hydride in 200 milliliters of anhydrous ether was added dropwise, with stirring, two grams of 3α,17α-dihydroxypregnane-11,20-dione 20-ethylene glycol ketal from Preparation 1 in twenty milliliters of anhydrous benzene. The mixture then was stirred at room temperature for one hour followed by boiling under reflux for an additional hour. With continued stirring the resulting mixture was cooled and treated cautiously with water added dropwise. The resulting solution containing the 3α,11,17α-trihydroxypregnan-20-one 20-ethylene glycol ketals then was admixed with a ten-fold excess of dilute hydrochloric acid and the resulting heterogeneous mixture was stirred vigorously for twenty hours at room temperature. The product was isolated by separating the organic and aqueous layers, extracting the aqueous layer with ether, combining the ether extract with the organic layer, washing the organic solution twice with water, drying the washed solution over anhydrous sodium sulfate, removing the drying agent by filtration, removing the solvents by distillation under reduced pressure, dissolving the resulting residual oil in ethyl acetate, and adding Skelly Solve B to give an opalescent solution. The crystals obtained (Crop A), 540 milligrams, were removed by filtration, and an additional quantity of Skelly Solve B was added to the filtrate. The crystals obtained from the diluted filtrate (Crop B) were separated by filtration weighed 590 milligrams. An additional quantity of crystals identical with those of Crop B was obtained from the remaining mother liquor by distillation of the solvents under reduced pressure, redissolving the residual oil in a minimum amount of ethyl acetate, and diluting with Skelly Solve B.

Crop A was recrystallized twice from a mixture of ethyl acetate and Skelly Solve B and once from a mixture of acetone and Skelly Solve B to give 240 milligrams of $3\alpha,11\alpha,17\alpha$-trihydroxypregnan-20-one as needles; melting point 184–186 degrees centigrade; $[\alpha]_D^{23}$ plus 52 degrees in acetone.

Analysis:
Calculated for $C_{21}H_{34}O_4$ _____ C, 71.9; H, 9.71
Found _____ C, 72.2; H, 9.53
C, 72.3; H, 9.66

Crop B was recrystallized once from a mixture of ethyl acetate and Skelly Solve B and once from a mixture of acetone and Skelly Solve B to give 275 milligrams of $3\alpha,11\beta,17\alpha$-trihydroxypregnan-20-one as plates; melting point 213–216 degrees centigrade; $[\alpha]_D^{23}$ plus 73 degrees in acetone.

Analysis:
Calculated for $C_{21}H_{34}O_4$ _____ C, 71.9; H, 9.71
Found _____ C, 72.1; H, 9.81

PREPARATION 3.—$3\beta$-ACETOXYPREGNANE-11,20-DIONE $3\beta$-hydroxypregnane-11,20-dione [Von Euw, Lardon, and Reichstein, Helv. Chim. Acta, 27, 821 (1944)], 8.18 grams, was dissolved in a mixture of fifty milliliters of acetic anhydride and two milliliters of pyridine, and the resulting solution was allowed to stand at room temperature for 24 hours. The mixture was then poured into 325 milliliters of water and allowed to stand at room temperature for several hours to permit decomposition of the excess acetic anhydride. The solid product was removed by filtration and dried under vacuum. Two recrystallizations from aqueous acetone gave 2.75 grams, melting point 155–162 degrees centigrade. Repeated recrystallization from aqueous acetone gave $3\beta$-acetoxypregnane-11,20-dione; melting point 164–165 degrees centigrade; $[\alpha]_D^{24}$ plus 99 degrees in chloroform.

Analysis:
Calculated for $C_{23}H_{34}O_4$ _____ C, 73.90; H, 9.10
Found _____ C, 73.69; H, 9.02
C, 73.64; H, 8.77

PREPARATION 4.—$3\beta,11,20$-TRIACETOXY-9(11),17(20)-PREGNADIENE

A mixture of 2.75 grams of $3\beta$-acetoxypregnane-11,20-dione from Preparation 3, 0.73 gram of para-toluenesulfonic acid monohydrate, and ninety milliliters of acetic anhydride was heated to boiling and allowed to distil slowly for three hours, 71 milliliters of distillate being collected. Another fifteen milliliters of distillate was collected by distillation under reduced pressure, and the resulting residue was cooled, diluted with 85 milliliters of ether, washed with one per cent aqueous sodium bicarbonate solution and with water, and dried over anhydrous sodium sulfate. After removing the drying agent by filtration, the ether was removed by distillation giving 3.5 grams of $3\beta,11,20$-triacetoxy-9(11),17(20)-pregnadiene as a glass.

PREPARATION 5.—17(20)-OXIDO-$3\beta,11,20$-TRIACETOXY-9(11)-PREGNENE $3\beta,11,20$-triacetoxy-9(11),17(20)-pregnadiene, 3.5 grams, from Preparation 4 was dissolved in seventeen milliliters of chloroform and the resulting solution cooled to a temperature of zero to five degrees centigrade. A mixture of 170 milligrams of anhydrous sodium acetate and 7.7 milliliters of 38 per cent peracetic acid was added with stirring, the temperature of the reaction mixture being maintained at zero to five degrees centigrade. The resulting mixture was stirred at this temperature for ten minutes, then allowed to come to room temperature, and stirred for an additional ninety minutes. The mixture then was diluted with eighty milliliters of ether, washed with four fifteen-milliliter portions of five per cent aqueous sodium hydroxide solution, and three fifteen-milliliter portions of water, and dried over anhydrous sodium sulfate. Removal of the drying agent by filtration and distillation of the solvents under reduced pressure gave 3.5 grams of 17(20)-oxido-$3\beta,11,20$-triacetoxy-9,(11)-pregnene as a viscous oil.

PREPARATION 6.—$3\beta,17\alpha$-DIHYDROXYPREGNANE-11,20-DIONE

The 17(20)-oxido-$3\beta,11,20$-triacetoxy-9(11)-pregnene from Preparation 5, 3.5 grams, was dissolved in 66 milliliters of alcohol, 66 milliliters of 0.5 normal aqueous sodium hydroxide solution added, and the resulting mixture stirred for thirty hours at room temperature under a nitrogen atmosphere. The mixture then was poured into 250 milliliters of water, and the resultant slurry extracted with four fifty-milliliter portions of chloroform. Distillation of the extraction solvent gave 2.74 grams of crude $3\beta,17\alpha$-dihydroxypregnane-11,20-dione.

PREPARATION 7.—$3\beta,17\alpha$-DIHYDROXYPREGNANE-11,20-DIONE 20-ETHYLENE GLYCOL KETAL In the same manner as given in Preparation 1, $3\beta,17\alpha$-dihydroxypregnane-11,20-dione 20-ethylene glycol ketal is prepared from $3\beta,17\alpha$-dihydroxypregnane-11,20-dione from Preparation 6 by reaction with ethylene glycol in the presence of para-toluene-sulfonic acid.

PREPARATION 8.—$3\beta,11\alpha,17\alpha$-TRIHYDROXYPREGNAN-20-ONE AND $3\beta,11\beta,17\alpha$-TRIHYDROXYPREGNAN-20-ONE One gram of $3\beta,17\alpha$-dihydroxypregnane-11,20-dione 20-ethylene glycol ketal from Preparation 7 was dissolved in fifteen milliliters of benzene, reduced with one gram of lithium aluminum hydride in 150 milliliters of ether, and subsequently hydrolyzed with acid using the procedure of Preparation 2. The ratio was about three parts of $3\beta,11\alpha,17\alpha$-trihydroxypregnan-20-one to about five parts of $3\beta,11\beta,17\alpha$-trihydroxypregnan-20-one.

Analysis of $3\beta,11\alpha,17\alpha$-trihydroxypregnan-20-one:
Calculated for $C_{21}H_{34}O_4$ _____ C, 71.9; H, 9.71
Found: _____ C, 71.8; H, 9.82
Analysis of $3\beta,11\beta,17\alpha$-trihydroxypregnan-20-one:
Calculated for $C_{21}H_{34}O_4$ _____ C, 71.9; H, 9.71
Found _____ C, 72.0; H, 9.72

PREPARATION 9.—$11\alpha$-HYDROXYPROGESTERONE

A medium was prepared from five milliliters of corn steep liquor, twenty grams of Edamine commercial lactalbumin digest, and fifty milligrams of Cerelose commercial dextrose, per liter of tap water and adjusted to a pH of between about 5.5 and about 5.9. To four liters of this medium containing a 32 to 48 hour growth, at room temperature with aeration, of *Rhizopus arrhizus*, was added one gram of progesterone in fifty milliliters of acetone. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two per cent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature, whereupon 75 milligrams of crystals separated out. The mother liquor was freed of solvent by aeration, dissolved in fifty milliliters of benzene and chromatographed over alumina (Al$_2$O$_3$). Fifty grams of acid-washed alumina, dried at 45 degrees centigrade, was used as adsorbent and 100-milliliter portions of solvents were used to develop the column. The solvents and the order used were as follows: benzene, benzene, benzene plus 5 per cent ether, benzene plus 5 per cent ether, benzene plus 10 per cent ether, benzene plus 10 per cent ether, benzene plus 10 per cent ether, benzene plus 50 per cent ether, benzene plus 50 per cent ether, ether, ether, ether plus 5 per cent chloroform, ether plus 5 per cent chloroform, ether plus 10 per cent chloroform, ether plus 10 per cent chloroform, ether plus 50 per cent chloroform, ether plus 50 per cent chloroform, chloroform, chloroform, chloroform plus 5 per cent acetone, chloroform plus 5 per cent acetone, chloroform plus 10 per cent acetone, chloroform plus 10 per cent acetone, chloroform plus 50 per cent acetone, chloroform plus 50 per cent acetone, acetone, acetone, acetone plus 5 per cent methanol, acetone plus 5 per cent methanol, acetone plus 10 per cent methanol, acetone plus 10 per cent methanol, acetone plus 50 per cent methanol, acetone plus 50 per cent methanol. The chloroform and chloroform plus five per cent acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade, was obtained. A sample recrystallized from methanol gave the following constants: melting point, 16–167 degrees centigrade; $[\alpha]_D^{20}$ plus 175.9 degrees (chloroform).

Analysis:
    Calculated for C$_{21}$H$_{30}$O$_3$ -------- C, 76.4; H, 9.10
    Found ------------------------ C, 76.6; H, 8.92

The structure of this product was further established by its conversion, with chromic acid in acetic acid, to 11-ketoprogesterone [Reichstein, Helv. Chim. Acta 23. 684 (1940); ibid. 26, 721 (1943)].

PREPARATION 10.—11α-HYDROXYPREGNANE-3,20-DIONE

A solution of 250 milligrams of 11α-hydroxyprogesterone from Preparation 9 in 100 milliliters of ethanol containing six drops of triethylamine was subjected to hydrogenation at room temperature under a pressure of about ten pounds of hydrogen in the presence of 45 milligrams of a thirty per cent palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145–185 degrees centigrade. This product was extracted with a mixture of one milliliter of ether and nine milliliters of Skelly Solve B. On standing, the extract deposited eighty milligrams (32 per cent) of 11α-hydroxypregnane-3,20-dione as feathery needles which melted at 85–90 degrees centigrade. Recrystallization from a mixture of about six drops of ethyl acetate and five milliliters of Skelly Solve B did not change the melting point.

Analysis:
    Calculated for C$_{21}$H$_{32}$O$_3$ ------ C, 75.86; H, 9.70
    Found ---------------------- C, 76.13; H, 9.73

PREPARATION 11.—3α,11α-DIHYDROXYPREGNAN-20-ONE

To a solution of 5.31 grams of 11α-hydroxypregnane-3,20-dione of Preparation 10 in 130 milliliters of peroxide-free dioxane maintained at fifty degrees centigrade in a water bath was added a solution of 195.5 milligrams of sodium borohydride (assay 84 per cent) in five milliliters of water. The mixture was stirred for one hour at fifty degrees centigrade, filtered, acidified with three normal aqueous hydrochloric acid solution, and evaporated under reduced pressure. The residue was crystallized from fifty milliliters of ethyl acetate to give 1.95 grams (36 per cent) of 3α,11α-dihydroxypregnan-20-one, which melted at 180–182 degrees centigrade. An additional 0.2 gram melting at 181–183 degrees centigrade was obtained from the filtrate, total yield, 2.15 grams (40 per cent).

PREPARATION 12.—11α-ACETOXYPREGNANE-3,20-DIONE

A mixture of 70.5 milligrams of 11α-hydroxypregnane-3,20-dione from Preparation 10, 0.8 milliliter of acetic anhydride, and 0.7 milliliter of pyridine was allowed to stand for sixteen hours at room temperature and then poured into ice water. The precipitated product was isolated by filtration and dried. The yield of 11α-acetoxypregnane-3,20-dione, melting at 143.5–146.5 degrees centigrade, was 67 milligrams (84 per cent). After one recrystallization from ether-Skelly Solve B, the melting point was 150–151 degrees centigrade; $[\alpha]_D^{23}$=plus 63 degrees (c=0.803 in chloroform).

Analysis:
    Calculated for C$_{23}$H$_{34}$O$_4$ -------- C, 73.76; H, 9.15
    Found ---------------------- C, 73.93; H, 9.32

In the same manner other 11α-acyloxypregnane-3,20-diones are prepared from 11α-hydroxypregnane-3,20-dione, including 11α-formyloxypregnane-3,20-dione (using formic acid as the acylating agent); 11α-propionoxypregnane-3,20-dione; 11α-butyryloxypregnane-3,20-dione; 11α-octanoyloxypregnane-3,20-dione; and the like.

PREPARATION 13.—3α,11α,20-TRIACETOXY-17(20)-PREGNENE

Four hundred and five (405) milligrams of 3α,11α-dihydroxypregnan-20-one from Preparation 11, 200 milligrams of para-toluene-sulfonic acid monohydrate and seventy milliliters of acetic anhydride were heated to distillation temperature and allowed to distil slowly for three and one-half hours. A total of sixty milliliters of distillate was collected. The residue was cooled to room temperature, poured into ice-water, and the resulting crystalline product collected and washed with water. Recrystallization from acetone-water yielded 332 milligrams of 3α,11α,20-triacetoxy-17(20)-pregnene, melting at 200–203 degrees centigrade.

PREPARATION 14.—3β,11α,20-TRIACETOXY-17(20)-PREGNENE

Using the procedure described in Preparation 13, 3β-hydroxy-11α-acetoxypregnan-20-one (prepared by the reduction of the 11α-acetoxypregnane-3,20-dione of Preparation 12 with hydrogen at two to three atmospheres pressure in methanol at room temperature using a Raney nickel catalyst), is converted to 3β,11α,20-triacetoxy-17(20)-pregnene with acetic anhydride in the presence of para-toluenesulfonic acid.

In the same manner as given above in Preparation 13 and Preparation 14, other 3α(or β),11α,20-triacyloxy-17(20)-pregnenes are prepared, including 3α,11α,20-tripropionoxy-17(20)-pregnene; 3β,11α,20-tripropionoxy-17(20)-pregnene; 3β,20-diacetoxy-11α-formyloxy-17(20)-pregnene, 3β,20-dipropionoxy-11α-acetoxy-17(20)-pregnene; 3α,11α,20-trioctanoyloxy-17(20)-pregnene; 3β,20-dioctanoyloxy-11α-propionoxy-17(20)-pregnene; 3α,11α,20-tributyryloxy-17(20)-pregnene; 3α,11α,20-trivaleroyloxy-17(20)-pregnene; 3α,11α,20-trihexanoyloxy-17(20)-pregnene; 3α,11α,20-triheptanoyloxy-17(20)-pregnene; and 3α,11α,20-trioctanoyloxy-17(20)-pregnene.

PREPARATION 15.—17(20)-OXIDO-3α,11α,20-TRIACETOXYPREGNANE

One and one-half grams of 3α,11α,20-triacetoxy-17(20)-pregnene (Preparation 13) was dissolved in 7.5 milliliters of chloroform, and the solution was cooled in an ice bath to about five degrees centigrade. Three and three-tenths milliliters of commercial grade forty per cent peracetic acid solution in which 100 milligrams of sodium acetate had been dissolved was added, and the resulting mixture was then shaken on a mechanical shaking machine for about two hours at room temperature to complete the reaction. The mixture containing the crude product was diluted with fifty milliliters of methylene chloride and then washed with several 25-milliliter portions of ice-cold five per cent aqueous sodium hydroxide solution followed by 25-milliliter portions of water until the wash solution was neutral to pH test paper. The neutral solution was dried with anhydrous sodium sulfate and then filtered to remove the drying agent. The white crystalline residue obtained on evaporating the solvent from the clear, dry solution melted at 210–213 degrees centigrade. Recrystallization from a mixture of ethyl acetate and Skelly Solve B gave fluffy needles of 17(20)-oxido-3α,11α,20-triacetoxypregnane, melting at 214–217 degrees centigrade.

Analysis:

Calculated for $C_{27}H_{40}O_7$ _____ C, 68.04; H, 8.46
Found _____ C, 68.33; H, 8.62
C, 67.90; H, 8.38

PREPARATION 16.—17(20)-OXIDO-3β,11α,20-TRIACETOXYPREGNANE

Using the procedure described in Preparation 15, 3β,11α,20-triacetoxy-17(20)pregnene from Preparation 14 is converted to 17(20)-oxido-3β,11α,20-triacetoxypregnane by oxidation with peracetic acid in the presence of sodium acetate.

In the same manner as given above in Preparation 15 and Preparation 16, other 17(20)-oxido-3α(orβ),11α,20-triacyloxypregnanes are prepared from the corresponding 3α(or β),11α,20-triacyloxy-17(20)-pregnenes, including 17(20)-oxido-3α,11α,20-tripropionoxypregnane; 17(20)-oxido-3β,11α,20-tripropionoxypregnane; 11α-acetoxy-3β,20-dipropionoxy-17(20)-oxidopregnane; 11α-formyloxy-3β,20-diacetoxy-17(20)-oxidopregnane; 17(20) - oxido-3α,11α,20-trioctanoyloxypregnane; 3β,20-dioctanoyloxy-17(20)-oxido-11α - propionoxypregnane; 17(20) - oxido-3α,11α,20-tributyryloxypregnane; 17(20) - oxido-3α,11α,20-trivaleryloxypregnane; 17(20)-oxido-3α,11,20-trihexanoyloxypregnane; 17(20) - oxido-3α,11α,20-triheptanoyloxypregnane; 17(20) - oxido - 3α,11α,20-trioctanoyloxypregnane; and the like.

PREPARATION 17.—11α - ACETOXY-3α,17α-DIHYDROXYPREGNAN-20-ONE AND 3α,11α,17α-TRIHYDROXYPREGNAN-20-ONE

Nine hundred milligrams of 17(20)-oxido-3α,11α,20-triacetoxypregnane (Preparation 15) was dissolved in fifty milliliters of alcohol, and to the resulting solution was added with swirling 11.3 milliliters of a 0.5 normal aqueous sodium hydroxide solution. After standing at room temperature for thirty minutes, the solution was extracted with chloroform, and the chloroform extract was then washed with twenty per cent aqueous sodium chloride solution and dried with anhydrous sodium sulfate. The drying agent was removed by filtration, and the solvent was removed by evaporation under reduced pressure giving the product as a colorless, viscous oil. The oil was dissolved in 100 milliliters of benzene, and the solution was passed through a chromatographic column packed with ninety grams of Florisil magnesium silicate to adsorb the product. The product was eluted from the column by washing with the following solvent mixtures in succession: Ten 100-milliliter portions of 5 per cent acetone and 95 per cent Skelly Solve B, ten 100-milliliter portions of 10 per cent acetone and 90 per cent Skelly Solve B, and then 100-milliliter portions of 20 per cent acetone and 80 per cent Skelly Solve B. On evaporation of the solvents from the various fractions, the product had been separated into two parts, both colorless viscous oils. The product from the first fractions was 11α-acetoxy-3α,17α-dihydroxypregnan-20-one, as confirmed by analytical data, and the product from the later fractions was 3α,11α,17α-trihydroxypregnan-20-one, identical with the 3α,11α,17α-trihydroxypregnan-20-one obtained in Preparation 2. The ratio was about one part of the acetoxy compound for every nine parts of the trihydroxy compound.

Analysis of 11α-acetoxy-3α,17α-dihydroxypregnan-20-one:

Calculated for $C_{23}H_{36}O_5$ _____ C, 70.37; H, 9.25
Found _____ C, 70.30; H, 9.30

PREPARATION 18.—11α-ACETOXY-3β,17α - DIHYDROXYPREGNAN-20-ONE AND 3β,11α,17α-TRIHYDROXYPREGNAN-20-ONE

Using the procedure described in Preparation 17, an alcohol solution of 17(20)-oxido-3β,11α,20-triacetoxypregnane (Preparation 16) was converted by treatment with an aqueous sodium hydroxide solution to an oily product which was separated into 11α-acetoxy-3β,17α-dihydroxypregnan-20-one and 3β,11α,17α-trihydroxypregnan-20-one, as confirmed by analytical data. The ratio was about one part of the acetoxy compound for every ten parts of the trihydroxy compound.

Analysis of 11α-acetoxy-3β,17α-dihydroxypregnan-20-one:

Calculated for $C_{23}H_{36}O_5$ _____ C, 70.37; H, 9.25
Found _____ C, 70.43; H, 9.19

Analysis of 3β,11α,17α-trihydroxypregnan-20-one:
Calculated for $C_{21}H_{34}O_4$ _____ C, 71.96; H, 9.78
Found _____ C, 71.80; H, 9.82

In the same manner as given above in Preparation 17 and Preparation 18, other 11α-acyloxy-3α(or β),17-dihydroxypregnan-20-ones are prepared, including 3α,17α-dihydroxy-11α-formloxypregnane-20 - one; 3α,17α - dihydroxy-11α-propionoxypregnan-20-one; 3β,17 - dihydroxy-11α-propionoxypregnan-20-one; 11α-butyryloxy-3α,17-dihydroxypregnan-20-one; 3α,17 - dihydroxy - 11α-valeryloxypregnan-20-one; 3α,17 - dihydroxy - 11α-hexanoyloxypregnan - 20 - one; 3α,17 - dihydroxy - 11α-heptanoyloxypregnan-20-one; 3α,17 - dihydroxy-11α-octanoyloxypregnan-20-one; and the like, depending on the starting material employed.

PREPARATION 19.—21-BROMO-3α,11α,17α-TRIHYDROXYPREGNAN-20-ONE

3α,11α,17α-trihydroxypregnan-20-one (Preparation 2 or 17), dissolved in chloroform, is treated with a solution of bromine in chloroform at about forty degrees centigrade. After completion of the bromination, the chloroform is distilled to give a theoretical yield of 21-bromo-3α,11α,17α - trihydroxypregnan - 20 - one; melting point 122.5 to 127 degrees centigrade.

PREPARATION 20.—21-BROMO-3α,11β,17α-TRIHYDROXYPREGNAN-20-ONE

3α,11β,17α-trihydroxypregnan-20-one (Preparation 2), brominated as in Preparation 19 yields 21-bromo-3α,11β,17α-trihydroxypregnan-20-one in quantitative yield.

PREPARATION 21.—21-BROMO-3β,11α,17α-TRIHYDROXYPREGNAN-20-ONE

Bromination of 3β,11α,17α-trihydroxypregnan-20-one (Preparation 8 or 18) using the procedure of Preparation 19 gives 21-bromo-3β,11α,17α-trihydroxypregnan-20-one in high yield.

PREPARATION 22.—21-BROMO-3β,11β,17α-TRIHYDROXYPREGNAN-20-ONE

Treatment of 3β,11β,17α - trihydroxypregnan - 20 - one (Preparation 8) with bromine in chloroform, according to the procedure of Preparation 19 yields 21-bromo-3β,11β,17α-trihydroxypregnan-20-one.

PREPARATION 23.—21-BROMO-11α-ACETOXY-3α,17α - DIHYDROXYPREGNAN-20-ONE

11α-acetoxy-3α,17α-dihydroxypregnan-20 - one (Preparation 17) brominated by the method of Preparation 19 gives a quantitative yield of 21-bromo-11α-acetoxy-3α,17α-dihydroxypregnan-20-one.

In the same manner other 21-bromo-11α-acyloxy-3α,17α-dihydroxypregnan-20-ones are prepared from corresponding 11α - acyloxy - 3α,17α-dihydroxypregnan-20-ones, including 21-bromo-11α-formyloxy-3α,17α-dihydroxypregnan-20-one; 21-bromo-11α-propionoxy-3α,17α-dihydroxypregnan-20-one; 21-bromo-11α-butyryloxy-3α,17α-dihydroxypregnan-20-one; 21-bromo-11α-valeryloxy-3α,17α-dihydroxypregnan-20-one; 21 - bromo - 11α - hexanoyloxy-3α,17α-dihydroxypregnan-20 - one; 21 - bromo-11α-heptanoyloxy - 3α,17α - dihydroxypregnan - 20 - one; 21-bromo-11α-octanoyloxy - 3α,17α - dihydroxypregnan-20-one; and the like.

PREPARATION 24.—21-BROMO-1α-ACETOXY-3β,17α-DIHYDROXYPREGNAN-20-ONE

Bromination of 11α-acetoxy-3β,17α-dihydroxypregnan-20-one (Preparation 18), using the method of Preparation 19, gives 21-bromo-11α-acetoxy-3β,17α-dihydroxypregnan-20-one in nearly theoretical amounts.

In the same manner other 21-bromo-11α-acyloxy-3β,17α-dihydroxypregnan-20-ones are prepared from corresponding 11α-acyloxy-3β,17α-dihydroxypregnan-20-ones, including 21 - bromo - 11α - formyloxy - 3β,17α - dihydroxypregnan-20-one; 21-bromo-11α-propionoxy-3β,17α-dihydroxypregnan-20-one; 21-bromo-11α-butyryloxy-3β,17α-dihydroxypregnan-20-one; 21-bromo-11α-valeryloxy-3β,17α-dihydroxypregnan-20-one; 21-bromo-11α-hexanoyloxy - 3β,17α - dihydroxypregnan - 20 - one; 21 - bromo-11α - heptanoyloxy - 3β,17α - dihydroxypregnan - 20- one; 21-bromo-11α-octanoyloxy-3β,17α-dihydroxypregnan-20-one; and the like.

PREPARATION 25.—21-CHLORO-3α,11α,17α-TRIHYDROXYPREGNAN-20-ONE

A solution of 3α,11α,17α-trihydroxypregnan-20-one (Preparation 2 or 17) in carbon tetrachloride is treated with chlorine, dissolved in carbon tetrachloride, at about room temperature. Distillation of the carbon tetrachloride solvent gives 21-chloro-3α,11α,17α-trihydroxypregnan-20-one in excellent yield.

In the same manner other 21-chloro-3,17α-dihydroxy-11-oxygenatedpregnan-20-ones are obtained from corresponding 3,17α-dihydroxy-11-oxygenatedpregnan-20-ones, including 21 - chloro - 3α,11β,17α - trihydroxypregnan-20 - one; 21 - chloro - 3β,11α,17α - trihydroxypregnan-20-one; 21-chloro-3β,11β,17α-trihydroxypregnan-20-one; 21 - chloro - 11α - acetoxy - 3α,17α - dihydroxypregnan-20-one; 21-chloro-11α-propionoxy-3α,17α-dihydroxypregnan-20-one; 21-chloro-11α-butyryloxy-3α,17α-dihydroxypregnan-20-one; 21-chloro-11α-valeryloxy-3α,17α-dihydroxypregnan-20-one; 21-chloro-11α-hexanoyloxy-3α,17α-dihydroxypregnan-20-one; 21-chloro-11α-heptanoyloxy-3α,17α-dihydroxypregnan-20-one; 21-chloro-11α-octanoyloxy-3α,17α-dihydroxypregnan-20-one; 21-chloro-11α-formyloxy-3β,17α-dihydroxypregnan-20-one; 21-chloro-11α-acetoxy-3β,17α-dihydroxypregnan-20-one; 21-chloro-11α - propionoxy - 3β,17α - dihydroxypregnan - 20 - one; 21 - chloro - 11α - butyryloxy - 3β,17α - dihydroxypregnan-20-one; 21-chloro-11α-valeryloxy-3β,17α-dihydroxypregnan - 20 - one; 21-chloro-11α-hexanoyloxy-3β,17α-dihydroxypregnan - 20 - one; 21 - chloro - 11α - heptanoyloxy-3β,17α-dihydroxypregnan-20-one; 21-chloro-11α-octanoyloxy-3β,17α-dihydroxypregnan-20-one; and the like.

PREPARATION 26.—21-ACETOXY-3α,11α,17α-TRIHYDROXYPREGNAN-20-ONE 21-bromo-3α,11α,17α-trihydroxypregnan-20-one (Preparation 19), dissolved in acetone is heated for about sixteen hours under reflux with excess anhydrous potassium acetate in the presence of a trace of potassium iodide and a trace of acetic acid. The resulting solution is cooled and then diluted with water to precipitate the 21-acetoxy-3α,11α,17α-trihydroxypregnan-20-one; melting point 185 to 189 degrees centigrade. The yield is nearly quantitative.

In the same manner other 21-acyloxy-3α,11α,17α-trihydroxypregnan-20-ones are prepared from 21-bromo-3α,11α,17α-trihydroxypregnan-20-one, and the appropriate potassium acylate, including 21-formyloxy-3α,11α,17α-trihydroxypregnan-20-one; 21-propionoxy-3α,11α,17α-trihydroxypregnan-20-one; 21-butyryloxy-3α,11α,17α-trihydroxypregnan - 20 - one; 21 - valeryloxy - 3α,11α,17α-trihydroxypregnan-20-one; 21-hexanoyloxy-3α,11α,17α-trihydroxypregnan-20-one; 21-heptanoyloxy-3α,11α,17α-trihydroxypregnan-20-one; 21-octanoyloxy-3α,11α,17α-trihydroxypregnan-20-one; and the like.

PREPARATION 27.—21-ACETOXY-3α,11β,17α-TRIHYDROXYPREGNAN-20-ONE

Replacement of the bromine atom in 21-bromo-3α,11β,17α-trihydroxypregnan-20-one (Preparation 20) by an acetoxy group is accomplished in the same manner as in Preparation 26. The yield of 21-acetoxy-3α,11β,17α-trihydroxypregnan-20-one is the theoretical amount.

In the same manner other 21-acyloxy-3α,11β,17α-trihydroxypregnan-20-ones are prepared from 21-bromo-3α,11β,17α-trihydroxypregnan-20-one and the appropriate potassium acylate, including 21-formyloxy-3α,11β,17α-trihydroxypregnan-20-one; 21-propionoxy-3α,11β,17α-trihydroxypregnan-20-one; 21-butyryloxy-3α,11α,17α-trihydroxypregnan - 20 - one; 21 - valeryloxy - 3α,11β,17α-trihydroxypregnan-20-one; 21-hexanoyloxy-3α,11β,17α-trihydroxypregnan-20-one; 21-heptanoyloxy-3α,11β,17α-trihydroxypregnan-20-one; 21-octanoyloxy-3α,11β,17α-trihydroxypregnan-20-one; and the like.

PREPARATION 28.—21-ACETOXY-3β,11α,17α-TRIHYDROXYPREGNAN-20-ONE 21-bromo-3β,11α,17α-trihydroxypregnan-20-one (Preparation 21) is converted to 21-acetoxy-3β,11α,17α-trihydroxypregnan-20-one by the method of Preparation 26.

In the same manner other 21-aceyloxy-3β,11α,17α-trihydroxypregnan-20-ones are prepared from 21-bromo-3β,11α,17α-trihydroxypregnan-20-one and the appropriate potassium acylate, including 21-formyloxy-3β,11α,17α-trihydroxypregnan-20-one; 21-propionoxy-3β,11α,17α-trihydroxypregnan - 20 - one; 21 - butyryloxy - 3β,11α,17α-trihydroxypregnan-20-one; 21-valeryloxy-3β,11α,17α-trihydroxypregnan-20-one; 21-hexanoyloxy-3β,11α,17α-trihydroxypregnan-20-one; 21-heptanoyloxy-3β,11α,17α-trihydroxypregnan-20-one; 21-octanoyloxy-3β,11α,17α-trihydroxypregnan-20-one; and the like.

PREPARATION 29.—21-ACETOXY-3β,11β,17α-TRIHYDROXYPREGNAN-20-ONE

According to the procedure of Preparation 26, 21-bromo - 3β,11β,17α - trihydroxypregnan - 20 - one (Preparation 22) is converted to 21-acetoxy-3β,11β,17α-trihydroxypregnan-20-one in high yield.

In the same manner other 21-acyloxy-3β,11β,17α-trihydroxypregnan-20-ones are prepared from 21-bromo-3β,11β,17α-trihydroxypregnan-20-one and the appropriate potassium acylate, including 21-formyloxy-3β,11β,17α-trihydroxypregnan-20-one; 21-propionoxy-3β,11β,17α-trihydroxypregnan - 20 - one; 21 - butyryloxy - 3β,11β,17α-trihydroxpregnan-20-one; 21-valeryloxy-3β,11β,17α-trihydroxypregnan-20-one; 21-hexanoyloxy-3β,11β,17α-trihydroxypregnan-20-one; 21-heptanoyloxy-3β,11β,17α-trihydroxypregnan-20-one; 21-octanoyloxy-3β,11β,17α-trihydroxypregnan-20-one; and the like.

PREPARATION 30.—11α,21-DIACETOXY-3α,17α-DIHYDROXYPREGNAN-20-ONE

Using the method of Preparation 26, 11α,21-diacetoxy-3α,17α-dihydroxypregnan-20-one is produced from 21- bromo - 11α - acetoxy - 3α,17α - dihydroxypregnan - 20-one (Preparation 23).

In the same manner other 11α,21-diacyloxy-3α,17α-dihydroxypregnan-20-ones are prepared from the appropriate 21-bromo-11α-acyloxy-3α,17α-dihydroxypregnan-20-one and the appropriate potassium acylate, including 21 - acetoxy - 11α - formyloxy - 3α,17α-dihydroxypregnan-20-one; 21-propionoxy-11α-acetoxy-3α,17α-dihydroxypregnan-20-one; 21-butyryloxy-11α-acetoxy-3α,17α-dihydroxypregnan-20-one; 21-valeryloxy-11α-acetoxy-3α,17α-dihydroxypregnan-20-one; 21-hexanoyloxy-11α-acetoxy-3α,17α-dihydroxypregnan-20-one; 21-heptanoyloxy-11α-acetoxy-3α,17α-dihydroxypregnan-20-one; 21-octanoyloxy - 11α - acetoxy - 3α,17α - dihydroxypregnan - 20 - one; 11α,21 - dipropionoxy - 3α,17α-dihydroxypregnan-20-one; 11α,21 - dibutyryloxy - 3α,17α-dihydroxypregnan-20-one; 11-α,21 - dihexanoyloxy-3α,17α-dihydroxypregnan-20-one; 11α,21 - dioctanoyloxy -3α,17α-dihydroxypregnan-20-one; 21 - acetoxy - 11α-propionoxy-3α,17α-dihydroxypregnan-20-one; and the like.

PREPARATION 31.—11α,21-DIACETOXY-3β,17α-DIHYDROXYPREGNAN-20-ONE

21 - bromo - 11α-acetoxy-3β,17a-dihydroxypregnan-20-one (Preparation 24) is treated with potassium acetate according to the procedure of Preparation 26 to give 11α,21-diacetoxy-3β,17α-dihydroxypregnan-20-one in high yield.

In the same manner other 11α,21-diacyloxy-3β,17α-dihydroxypregnan-20-ones are prepared from the appropriate 21-bromo-11α-acyloxy-3β,17α-dihydroxypregnan-20-one and the appropriate potassium acylate, including 21 - formyloxy-11α-acetoxy-3β,17α-dihydroxypregnan-20-one; 21-propionoxy-11α-acetoxy-3β,17α-dihydroxy-pregnan-20-one; 21-butyryloxy-11α-acetoxy-3β,17α-dihydroxypregnan-20-one; 21-valeryloxy-11α-acetoxy-3β,17α-dihydroxypregnan - 20 - one; 21 - hexanoyloxy-11α-acetoxy-3β,17α-dihydroxypregnan-20-one; 21-heptanoyloxy-11α-acetoxy-3β,17α-dihydroxypregnan-20-one; 21-octanoyloxy - 11α - acetoxy - 3β,17α - dihydroxypregnan - 20-one; 11α,21 - dipropionoxy - 3β,17α-dihydroxypregnan-20-one; 11α,21 - dibutyryloxy - 3β,17α-dihydroxypregnan-20-one; 11α,21 - dihexanoyloxy-3β,17α-dihydroxypregnan-20-one; 11α,21 - dioctanoyloxy -3β,17α-dihydroxypregnan-20-one; 21 - acetoxy - 11α-propionoxy-3β,17α-dihydroxypregnan-20-one; and the like.

The 21-acyloxysteroids obtained in Preparation 26 through Preparation 31 from the 21-bromosteroids may also be obtained in the same manner by substituting the corresponding 21-chlorosteroid (Preparation 25) for the 21-bromosteroid specified.

*Example 1.—Pregnane-3,11,20-trione*

To a stirred solution of 400 milligrams (1.2 millimoles) of 3α-hydroxypregnane-11,20-dione [Von Euw, Lardon and Reichstein, Helv. Chim. Acta, 27, 821 (1944)] in eight milliliters of anhydrous tertiary-butyl alcohol is added 0.5 milliliter (about 4.4 millimoles) of tertiary-butyl hypochlorite prepared according to the procedure of Chattaway and Backeberg, J. Chem. Soc., 125, 2999 (1923). The reaction mixture is kept in the dark and stirred for four hours at room temperature whereafter the whole is evaporated to dryness at room temperature giving a quantitative yield of 400 milligrams of pregnane-3,11,20-trione which, without purification, melts at 146 to 151 degrees centigrade and has an infrared absorption spectrum identical with that of an authentic sample.

*Example 2.—17α-hydroxy-21-acetoxypregnane-3,11,20-trione*

In the same manner as described in Example 1, 0.50 gram (1.2 millimoles) of 3α,17α-dihydroxy-21-acetoxypregnane-11,20-dione [Sarett, J. Am. Chem. Soc., 70, 1454 (1948)] is reacted for five hours in the dark at room temperature with 0.4 milliliter (about 3.5 millimoles) of tertiary-butyl hypochlorite in 25 milliliters of anhydrous tertiary-butyl alcohol, whereafter the whole is evaporated to dryness at reduced pressure leaving the theoretical yield of 0.50 gram of 17α-hydroxy-21-acetoxypregnane-3,11,20-trione which, without purification, melts at 215 to 221 degrees centigrade and has an infrared absorption spectrum which is identical with that of an authentic sample. Bromination at the 4-position followed by dehydrohalogenation yields cortisone acetate.

*Example 3.—17α-hydroxypregnane-3,11,20-trione*

In the same manner as described in Example 1, 0.86 gram of 3α,17α-dihydroxypregnane-11,20-dione [Sarett, J. Am. Chem. Soc., 70, 1454 (1948)] is reacted with 0.875 gram of tertiary-butyl hypochloriate in fifty milliliters of anhydrous tertiary-butyl alcohol. The reaction mixture is stirred and kept in the dark at room temperature for two hours. The consumption of the tertiary-butyl hypochlorite is followed by periodical iodometric titrations of aliquot samples, the theoretical amount of tertiary-butyl hypochlorite being consumed in one hour whereafter no more is consumed. Removal of the volatile components of the reaction mixture by distillation at reduced pressure gives as the residue the theoretical amount of 17α-hydroxypregnane-3,11,20-trione which, without purification, melts at 193 to 198 degrees centigrade and has an infrared spectrum analysis which is identical with that of an authentic sample. Bromination at the 4 and 21-positions, followed by dehydrohalogenation to introduce a 4-double bond, and finally treatment with potassium acetate to replace the 21-bromine atom with an acetoxy group, yields cortisone acetate.

*Example 4.—Cholestan-3-one*

In the same manner as described in Example 1, 0.39 gram of cholestan-3β-ol is reacted in the dark at room temperature for five hours with 0.4 milliliter of tertriary-butyl hypochlorite in 25 milliliters of anhydrous tetriary-butyl alcohol whereafter the volatile components of the reaction mixture are removed by distillation at reduced pressure leaving a quantitative yield of cholestan-3-one as the residue which, without purification, melts at 126.5 to 128 degrees centigrade and has an infrared absorption spectrum which is identical with that of an authentic sample.

In the same manner as described above using the same quantities of the same reactants but conducting the reaction in the presence of light instead of in the dark for a reaction period of three hours instead of five hours, and then pouring the reaction product into water and removing the solid by filtration instead of distilling the solvents to isolate the solid product, 0.35 gram of 2-chlorocholestan-3-one is obtained, melting point 115–130 degrees centigrade.

*Example 5.—Allopregnane-3,11,20-trione*

In the same manner as described in Example 1, 184 milligrams of 3β-hydroxyallopregnane-11,20-dione [Stork et al., J. Am. Chem Soc., 73, 3546 (1951)] dissolved in nine milliliters of tertiary-butyl alcohol is reacted overnight at room temperature with 0.19 milliliter of tertiary-butyl hypochlorite whereafter 143 milligrams of allopregnane-3,11,20-trione which melts at 203 to 207 degrees centigrade and has an infrared absorption spectrum identical with an authentic sample, crystallizes from the reaction mixture and is removed by filtration. Evaporation of the filtrate to dryness provides an additional forty milligrams of allopregnane 3,11,20-trione.

*Example 6.—17α-hydroxy - 21 - bromopregnane-3,11,20-trione*

In the same manner as given in Example 1, two grams of 3α,17α-dihydroxy - 21 - bromopregnane - 11,20 - dione [Kritchevsky et al., J. Am. Chem. Soc., 74, 483 (1952)] is reacted for 1.5 hours at room temperature with two milliliters of tertiary-butyl hypochlorite in 100 milliliters of anhydrous tertiary-butyl alcohol whereafter the volatile components are removed by distillation at reduced pressure leaving as the residue the theoretical quantity of 17α-hydroxy-21-bromopregnane-3,11,20-trione which, without purification, melts at 210 to 214 degrees centigrade. Recrystallization of this material gives product melting at 220 to 225 degrees centigrade. Bromination gives the 4,21-dibromo compound which can be converted to cortisone acetate as shown in example 3.

*Example 7.—11α-hydroxypregnane-3,20-dione*

In the same manner as described in Example 1, 3α,11α-dihydroxypregnan-20-one [Von Euw, Lardon and Reichstein, Helv. Chim. Acta, 27, 1287 (1944)] is reacted with tertiary-amyl hypochlorite in tertiary-amyl alcohol at 35 degrees centigrade to produce 11α-hydroxypregnane-3,20-dione, an analytical sample of which melts at 126 to 127 degrees centigrade. 4-bromination followed by dehydrohalogenation yields the known 11α-hydroxyprogesterone.

Selective reduction of 11α-acetoxypregnane-3,20-dione (Preparation 12) with sodium borohydride in dioxane and water is productive of 3α-hydroxy-11α-acetoxypregnan-20-one melting at 122 to 136 degrees centigrade, which, in the same manner as described in Example 1, is reacted with ethyl hypochlorite in a large volume of anhydrous tertiary-amyl alcohol at about zero degrees centigrade for 24 hours to produce 11α-acetoxypregnane-3,20-dione melting at 143.5 to 146.5 degrees centigrade in high yield. Hydrolysis of the ester grouping gives 11α-hydroxypregnane-3,20-dione identical with the product obtained above.

*Example 8.—21-chloro-17α-hydroxypregnane-3,11,20-trione*

Treatment of 3α,17α-dihydroxypregnane-11,20-dione [Sarett, J. Am. Chem. Soc., 70, 1454 (1948)] with chlorine in acetic acid is productive of 3α,17α-dihydroxy-21-chloropregnane-11,20-dione.

In the same manner as described in Example 1, reacting 3α,17α-dihydroxy-21-chloropregnane-11,20-dione with tertiary-butyl hypochlorite in tertiary-butyl alcohol is productive of 21-chloro-17α-hydroxypregnane-3,11,20-trione in high yield.

21-chloro-17α-hydroxypregnane-3,11,20-trione is brominated in the 4-position with bromine in acetic acid, dehydrohalogenated to produce a 4(5)-double bond using semicarbazide hydrochloride followed by pyruvic acid, and then treated with potassium acetate to obtain cortisone acetate.

*Example 9.—17α-hydroxypregnane-3,11,20-trione*

In the same manner as described in Example 3, a solution of 3α,11β,17α-trihydroxypregnan-20-one (Preparation 2) in anhydrous tertiary-butyl alcohol is reacted with tertiary-butyl hypochlorite to give a high yield of 17α-hydroxypregnane-3,11,20-trione, melting at 194–198 degrees centigrade and identical with the product of Example 3.

In the same manner as shown above, 3β,11β,17α-trihydroxy pregnan-20-one (Preparation 8) is converted to 17α-hydroxypregnane-3,11,20-trione.

*Example 10.—11α,17α-dihydroxypregnane-3,20-done*

3α,11α,17α-trihydroxypregnan-20-one (Preparation 2 or 17) is converted, in high yield, to 11α,17α-dihydroxypregnane-3,20-dione using the procedure of Example 3. In the same manner 3β,11α,17α-trihydroxypregnan-20-one (Preparation 8 or 18) is converted to 11α,17α-dihydroxypregnane-3,20-dione; melting point 191.5 to 192.5 degrees centigrade.

Analysis: Calculated for $C_{21}H_{32}O_4$___ C, 72.38; H, 9.26
Found _____ C, 72.15; H, 9.30

Mild oxidation of 11α,17α-dihydroxypregnane-3,20-dione with chromic acid in acetic acid solution gives 17α-hydroxypregnane-3,11,20-trione (Example 3).

*Example 11.—11α-acetoxy-17α-hydroxypregnane-3,20-dione*

11α-acetoxy-3α,17α-dihydroxypregnan-20-one (Preparation 17) is transformed, according to the method of Example 1, into 11α-acetoxy-17α-hydroxypregnane-3,20-dione, the yield being about the theoretical amount. In the same manner 11α-acetoxy-3β,17α-dihydroxypregnan-20-one (Preparation 18) gives 11α-acetoxy-17α-hydroxypregnane-3,20-dione.

In the same manner other 11α-acyloxy-17α-hydroxypregnane-3,20-diones are prepared from 11α-acyloxy-3α(or β),17α-dihydroxypregnan-20-ones, including 11α-formyloxy-17α-hydroxypregnane-3,20-dione; 11α-propionoxy-17α-hydroxypregnane-3,20-dione; 11α-butyryloxy-17α-hydroxypregnane-3,20-dione; 11α-valeryloxy-17α-hydroxypregnane-3,20-dione; 11α-hexanoyloxy-17α-hydroxypregnane-3,20-dione; 11α-heptanoyloxy-17α-hydroxypregnane-3,20-dione; 11α-octanoyloxy-17α-hydroxypregnane-3,20-dione; and the like.

The 11α-acyloxy-17α-hydroxypregnane-3,20-diones may be converted to cortisone acetate by brominating at the 4 and 21-positions using bromine in acetic acid to produce the 4,21-dibromo-11α-acyloxy-17α-hpdroxypregnane-3,20-diones, dehydrohalogenating with pyridine to remove hydrogen bromide and obtain 21-bromo-11α-acyloxy-17α-hydroxy-4-pregnene-3,20-diones, hydrolyzing the 21-bromine and the 11α-acyloxy group to produce 11α,17α,21-trihydroxy-4-pregnene-3,20-dione using sodium hydroxide in aqueous alcohol, acetylating the 21-hydroxyl group with one equivalent of acetic anhydride in pyridine to produce 21-acetoxy-11α,17α-dihydroxy-4-pregnene-3,20-dione, and mildly oxidizing the 11α-hydroxy group with chromic acid in acetic acid to produce an eleven-keto group.

*Example 12.—21-bromo-11α,17α-dihydroxypregnane-3,20-dione*

Following the method of Examples 6, 21-bromo-3α,11α,17α-trihydroxypregnan-20-one (Preparation 19) gives 21-bromo-11α,17α-dihydroxypregnane-3,20-dione in excellent yield. In the same manner 21-bromo-11α,17α-dihydroxypregnane-3,20-dione is obtained from 21-bromo-3β,11α,17α-trihydroxypregnan-20-one (Preparation 21).

Mild oxidation of the 11α-hydroxy group of 21-bromo-11α,17α-dihydroxypregnane-3,20-dione gives 21-bromo-17α-hydroxypregnane-3,11,20-trione which can be converted to cortisone acetate as shown in Example 6.

*Example 13.—21-bromo-17α-hydroxypregnane-3,11,20-trione*

According to the procedure of Example 1, 21-bromo-3α,11β,17α-trihydroxypregnan-20-one (Preparation 20) is converted to 21-bromo-17α-hydroxypregnane-3,11,20-trione, which is identical with the product of Example 6 in essentially quantitative yield; melting point 215–220 degrees centigrade. In the same manner 21-bromo-3β,11β,17α-trihydroxypregnan-20-one (Preparation 22) yields 21-bromo-17α-hydroxypregnane-3,11,20-trione which may be converted to cortisone acetate as shown in Example 6.

*Example 14.—21-bromo-11α-acetoxy-17α-hydroxypregnane-3,20-dione*

21-bromo-11α-acetoxy-3α,17α-dihydroxypregnan-20-one is treated with tertiary-butyl hypochlorite according to the method of Example 3 to obtain 21-bromo-11α-acetoxy-17α-hydroxypregnane-3,20-dione. Use of the starting compound 21-bromo-11α-acetoxy-3β,17α-dihydroxypregnan-20-one also gives 21-bromo-11α-acetoxy-17α-hydroxypregnane-3,20-dione in high yield.

In the same manner other 21-bromo-11α-acyloxy-17α-hydroxypregnane-3,20-diones are prepared from the corresponding 21-bromo-11α-acetoxy-3α(or β),17α-dihydroxypregnan-20-ones, including 21-bromo-11α-propionoxy-17α-hydroxypregnane-3,20-dione; 21-bromo-11α-formyloxy-17α-hydroxypregnane-3,20- dione; 21 - bromo - 11α - butyryloxy - 17α - hydroxypregnane - 3,20 - dione; 21 - bromo - 11α - valeryloxy - 17α - hydroxypregnane - 3,20 - dione; 21 - bromo - 11α - hexanoyloxy - 17α - hydroxypregnane - 3,20 - dione; 21 - bromo - 11α - heptanoyloxy - 17α - hydroxypregnane - 3,20 - dione; 21 - bromo - 11α - octanoyloxy - 17α - hydroxypregnane-3,20-dione; and the like.

21 - bromo - 11α - acyloxy - 17α - hydroxypregnane - 3,20-diones may be converted to cortisone acetate as shown in Example 11.

*Example 15.—21 - chloro - 11α,17α - dihydroxypregnane - 3,20-dione*

21 - chloro - 3α,11α,17α - trihydroxypregnan - 20 - one (Preparation 25) is converted, according to the method of Example 1, to 21-chloro-11α,17α-dihydroxypregnane-3,20-dione.

In the same manner other 21-chloro-11-oxygenated-17α-hydroxypregnane-3,20-diones are prepared from corresponding 21 - chloro - 11 - oxygenated - 3,17α - dihydroxypregnan - 20 - ones, including 21 - chloro - 11α - propionoxy 17α - hydroxypregnane - 3,20 - dione; 21 - chloro - 11α - formyloxy - 17α - hydroxypregnane - 3,20 - dione; 21 - chloro - 11α - butyryloxy - 17α - hydroxypregnane - 3,20 - dione; 21 - chloro - 11α - valeryloxy - 17α - hydroxypregnane - 3,20 - dione; 21 - chloro - 11α - hexanoyloxy - 17α - hydroxypregnane - 3,20 - dione; 21 - chloro - 11α - heptanoyloxy - 17α - hydroxypregnane - 3,20 - dione; 21 - chloro - 11α - octanoyloxy - 17α - hydroxypregnane-3,20-dione; and the like.

The 21-chloro derivatives may be converted to cortisone acetate in the same manner as the 21-bromo derivatives of Example 12 through Example 14.

*Example 16.—21 - acetoxy - 11α,17α - dihydroxypregnane-3,20-dione*

Using the method of Example 1, 21-acetoxy-3α,11α,17α-trihydroxypregnan-20-one (Preparation 26) gives about the theoretical amount of 21-acetoxy-11α,17α-dihydroxypregnane-3,20-dione. In the same manner 21-acetoxy-3β,11α,17α - trihydroxypregnan - 20 - one (Preparation 28) is converted to 21-acetoxy-11α,17α-dihydroxypregnane-3,20-dione.

Other 21 - acyloxy - 11α,17α - dihydroxypregnane - 3,20-diones are prepared from the appropriate 21-acyloxy-3α(or β),11α,17α - trihydroxypregnan - 20 - ones in the same manner, including 21-propionoxy-11α,17α-dihydroxypregnane - 3,20 - dione; 21 - formyloxy - 11α,17α - dihydroxypregnane - 3,20 - dione; 21 - butyryloxy - 11α,17α - dihydroxypregnane - 3,20 - dione; 21 - valeryloxy - 11α,17α - dihydroxypregnane - 3,20 - dione; 21 - hexanoyloxy 11α,17α - dihydroxypregnane - 3,20 - dione; 21 - heptanoyloxy - 11α,17α - dihydroxypregnane - 3,20 - dione; 21 - octanoyloxy - 11α,17α - dihydroxypregnane-3,20-dione; and the like.

21 - acyloxy - 11α,17α - dihydroxypregnane - 3,20 - diones are oxidized with chromic acid in acetic acid under mild conditions to obtain 21-acyloxy-17α-hydroxypregnane-3,11,20-triones which are convertible to cortisone acylates as shown in Example 2 for cortisone acetate preparation.

*Example 17.—21-acetoxy-17α-hydroxypregnane-3,11,20-trione*

21 - acetoxy - 3α,11β,17α - trihydroxypregnan - 20 - one (Preparation 27) is treated with about six molar equivalents of tertiary-butyl hypochlorite according to the method of Example 2 to give nearly the theoretical quantity of 21-acetoxy-17α-hydroxpregnane-3,11,20-trione melting at 216–221 degrees centigrade, identical with the product of Example 2. The same product is obtained in the same manner starting with 21-acetoxy-3β,11β,17α-trihydroxypregnan-20-one.

In the same manner other 21-acyloxy 17α-hydroxypregnane-3,11,20-triones are prepared from corresponding 21-acyloxy-3α(or β),11β,17α-trihydroxypregnan-20-ones, including 21 - propionoxy - 17α - hydroxypregnane - 3,11,20 - trione; 21 - formyloxy - 17α - hydroxypregnane - 3,11,20 - trione; 21 - butyryloxy 17α - hydroxypregnane - 3,11,20 - trione; 21 - valeryloxy - 17α - hydroxypregnane - 3,11,20 - trione; 21 - hexanoyloxy - 17α - hydroxpregnane - 3,11,20 - trione; 21 - heptanoyloxy - 17α - hydroxypregnane - 3,11,20 - trione; 21 - octanoyloxy 17α - hydroxypregnane - 3,11,20 - trione; and the like.

21 - acyloxy - 17α - hydroxypregnane - 3,11,20 - triones are convertible to cortisone acylates as shown in Example 2 for cortisone acetate preparation.

*Example 18.—11α,21-diacetoxy-17α-hydroxypregnane-3,20-dione*

Treating 11α,21 - diacetoxy - 3α,17α - dihydroxypregnan-20-one (Preparation 30) with tertiary-butyl hypochlorite according to the procedure of Example 1 gives high yields of 11α,21-diacetoxy-17α-hydroxypregnane-3,20-dione; melting point 222 to 226 degrees centigrade. In the same manner 11α,21-diacetoxy-3β,17α-dihydroxypregnan-20-one (Preparation 31) is converted to 11α,21-diacetoxy - 17α - hydroxypregnane - 3,20 - dione in similar yield.

Other 11α,21 - diacetoxy - 17α-hydroxypregnane-3,20-diones are prepared from 11α,21-diacyloxy-3α(or β),17α-dihydroxypregnan-20-ones in the same manner, including 11α - acetoxy-21-propionoxy-17α-hydroxypregnane-3,20 - dione; 11α - acetoxy-21-formyloxy-17α-hydroxypregnane-3,20-dione; 11α-acetoxy-21-butyryloxy-17α-hydroxypregnane-3,20-dione; 11α-acetoxy-21-valeryloxy-17α-hydroxypregnane-3,20-dione; 11α-acetoxy-21-hexanoyloxy - 17α - hydroxypregnane-3,20-dione; 11α-acetoxy-21-heptanoyloxy - 17α - hydroxypregnane - 3,20 - dione; 11α-acetoxy - 21 - octanoyloxy - 17α - hydroxypregnane 3,20 - dione; 11α,21 - dipropionoxy - 17α - hydroxypregnane - 3,20-dione; 11α,21-diformyloxy-17α-hydroxypregnane-3,20-dione; 11α,21 - dibutyryloxy-17α-hydroxypregnane - 3,20 - dione; 11α,21 - dihexanoyloxy-17α-hydroxypregnane - 3,20 - dione; 11α,21-dioctanoyloxy-17α-hydroxypregnane-3,20-dione; 11α-propionoxy-21-acetoxy-17α-hydroxypregnane-3,20-dione; and the like.

4-bromination of the 11α,21-diacyloxy-17α-hydroxypregnane-3,20-diones and treatment of the 4-bromo-11α,21 - diacyloxy-17α-hydroxypregnane-3,20-diones with semicarbazide hydrochloride followed by pyruvic acid gives 11α,21 - diacyloxy - 17α-hydroxy-4-pregnene-3,20-diones. Saponification of these diacyloxypregnenes with sodium hydroxide in aqueous alcohol gives 11α,17α,21-trihydroxy-4-pregnene-3,20-dione which may be converted to cortisone acetate as shown in Example 11.

In the same manner as described in Example 1 through Example 18, other secondary-hydroxysteroids are converted to ketosteroids using tertiary-butyl, tertiary-amyl, or other hypochlorite, such as, for example, propyl hypochlorite, hexyl hypochlorite, octyl hypochlorite, or the like, including the following examples: coprostanol or epicoprostanol gives coprostanone; 3α(or β)-hydroxy-21-acetoxypregnane-11,20-dione or 3α(or β),11β-dihydroxy-21-acetoxypregnan-20-one gives 21-acetoxypregnane-3,11,20-trione, melting point 155 to 158 degrees centigrade, which on 4-bromination followed by dehydrohalogenation yields the known 21-acetoxy-4-pregnene-3,11,20-trione; 3α(or β)-hydroxy-17-isoetiocholanic acid methyl ester gives 3-keto-17-isotiocholanic acid methyl ester; 3α(or β),11β-dihydroxypregnan-20-one gives pregnane-3,-11,20-trione; 11β-hydroxycholanic acid methyl ester gives 11-ketocholanic acid methyl ester, 3α(or β)-hydroxyallopregnan - 20 - one gives allopregnane - 3,20 - dione melting point 197 to 199 degrees centigrade; and other like examples.

It is to be understood that the invention is not to be limited to the exact details of operation or exact compounds shown and described as obvious modifications and equivalents will be apparent to one skilled in the art and

We claim:

1. A process which comprises: contacting a saturated secondary-hydroxy-steroid with an organic hypochlorite under substantially anhydrous conditions to convert the secondary-hydroxy group to a keto group.

2. A process which comprises: contacting a saturated secondary-hydroxy-steroid with an alkyl hypochlorite under substantially anhydrous conditions in the presence of an organic solvent at a temperature between about minus twenty and about plus fifty degrees centigrade to convert the secondary-hydroxy group to a keto group.

3. A process which comprises: contacting a saturated 3-hydroxysteroid with an organic hypochlorite under substantially anhydrous conditions to produce a 3-ketosteroid.

4. A process for the oxidation of a secondary-hydroxysteroid to a ketosteroid which comprises: contacting a saturated 3-hydroxysteroid with an alkyl hypochlorite under substantially anhydrous conditions in the presence of an organic solvent at a temperature between about minus twenty and about plus fifty degrees centigrade to produce a 3- ketosteroid.

5. A process for the oxidation of a secondary-hydroxysteroid to a ketosteroid which comprises: contacting a saturated 3-hydroxysteroid containing no primary hydroxy groups with an alkyl hypochlorite under substantially anhydrous conditions in the presence of an organic solvent at a temperature between about minus twenty and about plus fifty degrees centigrade to produce a 3-ketosteroid.

6. A process for the oxidation of a secondary-hydroxysteroid to a ketosteroid which comprises: contacting a saturated 11-keto-3-hydroxysteroid containing no primary or other secondary-hydroxy groups with an alkyl hypochlorite containing more than one carbon atom under substantially anhydrous conditions in the presence of an organic solvent at a temperature between about minus twenty and about plus fifty degrees centigrade, to produce a 3,11-diketosteroid.

7. A process for the oxidation of a secondary-hydroxysteroid to a ketosteroid which comprises: contacting a saturated 3,11α-dihydroxysteroid containing no primary or other secondary-hydroxy groups with an alkyl hypochlorite containing more than one carbon atom under substantially anhydrous conditions in the presence of an organic solvent at a temperature between about minus twenty and about plus fifty degrees centigrade, to convert the 3-hydroxy group to a 3-keto group.

8. A process for the oxidation of a secondary-hydroxysteroid to a ketosteroid which comprises: containing a saturated 3,11β-dihydroxysteroid containing no primary or other secondary-hydroxy groups with an alkyl hypochlorite containing more than one carbon atom under substantially anhydrous conditions in the presence of an organic solvent at a temperature between about minus twenty and about plus fifty degrees centigrade, to convert the 3-hydroxy group to a 3-keto group.

9. A process for the oxidation of a secondary-hydroxysteroid to a ketosteroid which comprises: contacting a saturated 11-keto-3-hydroxysteroid containing no primary or other secondary-hydroxy groups with at least about two molar equivalents of a tertiary-alkyl hypochlorite under substantially anhydrous conditions in the presence of an organic solvent at a temperature between about minus twenty and about plus fifty degrees centigrade to produce a 3,11-diketosteroid.

10. A process for the oxidation of a secondary-hydroxysteroid to a ketosteroid which comprises: contacting a saturated 3,11α-dihydroxysteroid containing no primary or other secondary-hydroxy groups with at least about two molar equivalents of a tertiary-alkyl hypochlorite under substantially anhydrous conditions in the presence of an organic solvent at a temperature between about minus twenty and about plus fifty degrees centigrade to produce a 3-keto-11α-hydroxysteroid.

11. A process for the oxidation of a secondary-hydroxysteroid to a ketosteroid which comprises: contacting a saturated 3,11β-dihydroxysteroid containing no primary or other secondary-hydroxy groups with at least about four molar equivalents of a tertiary-alkyl hypochlorite under substantially anhydrous conditions in the presence of an organic solvent at a temperature between about minus twenty and about plus fifty degrees centigrade to produce a 3,11-diketosteroid.

12. A process for the oxidation of a secondary-hydroxysteroid to a ketosteroid which comprises: contacting 3,17α-dihydroxy-pregnane-11,20-dione with between about three and about four molar equivalents of tertiary-butyl hypochlorite under substantially anhydrous conditions in the presence of an organic solvent at a temperature between about twenty and about thirty degrees centigrade to convert the 3-hydroxy group to a 3-keto group.

13. A process for the oxidation of a secondary-hydroxysteroid to a ketosteroid which comprises: contacting 3,17α-dihydroxy-21-bromopregnane-11,20-dione with between about three and about four molar equivalents of tertiary-butyl hypochlorite under substantially anhydrous conditions in the presence of an organic solvent at a temperature between about twenty and about thirty degrees centigrade to convert the 3-hydroxy group to a 3-keto group.

14. A process for the oxidation of a secondary-hydroxysteroid to a ketosteroid which comprises: contacting a 3,17α-dihydroxy-21-acyloxypregnane-11,20-dione with at least about two molar equivalents of tertiary-butyl hypochlorite under substantially anhydrous conditions in the presence of an organic solvent at a temperature between about twenty and about thirty degrees centigrade to convert the 3-hydroxy group to a 3-keto group.

15. A process for the oxidation of a secondary-hydroxysteroid to a ketosteroid which comprises: contacting a 3,11α,17α-trihydroxy-21-acyloxypregnan-20-one with at least about two molar equivalents of tertiary-butyl hypochlorite under substantially anhydrous conditions in the presence of an organic solvent at a temperature between about twenty and about thirty degrees centigrade to convert the 3-hydroxy group to a 3-keto group.

16. A process for the oxidation of a secondary-hydroxysteroid to a ketosteroid which comprises: contacting a 3,11β,17α-trihydroxy-21-acyloxypregnan-20-one with at least about four molar equivalents of tertiary-butyl hypochlorite under substantially anhydrous conditions in the presence of an organic solvent at a temperature between about twenty and about thirty degrees centigrade to convert the 3-hydroxy group to a keto group.

17. A process for the oxidation of a secondary-hydroxysteroid to a ketosteroid which comprises: contacting 3,17α-dihydroxy-21-acetoxypregnane-11,20-dione with between about three and about four molar equivalents of tertiary-butyl hypochlorite under substantially anhydrous conditions in the presence of tertiary-butyl alcohol at a temperature between about twenty and about thirty degrees centigrade to convert the 3-hydroxy group to a 3-keto group.

18. A process for the oxidation of a secondary-hydroxysteroid to a ketosteroid which comprises: contacting 3,11α,17α-trihydroxy-21-acetoxypregnan-20-one with between about three and about four molar equivalents of tertiary-butyl hypochlorite under substantially anhydrous conditions in the presence of tertiary-butyl alcohol at a temperature between about twenty and about thirty degrees centigrade to convert the 3-hydroxy group to a 3-keto group.

19. A process for the oxidation of a secondary-hydroxysteroid to a ketosteroid which comprises: contacting 3,11β,17α-trihydroxy-21-acetoxypregnan-20-one with between about six and about eight molar equivalents of tertiary-butyl hypochlorite under substantially anhydrous conditions in the presence of tertiary-butyl alcohol at a temperature between about twenty and about thirty degrees centigrade to convert the 3-hydroxy group to a keto group.

20. A process for the oxidation of a secondary-hydroxysteroid to a ketosteroid which comprises: contacting a 3-hydroxysteroid of the following formula:

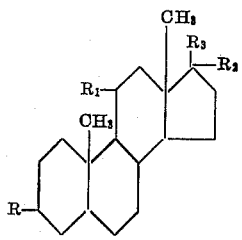

wherein R is selected from the group consisting of $\alpha$-hydroxy and $\beta$-hydroxy; $R_1$ is selected from the group consisting of hydrogen, $\alpha$-hydroxy, $\alpha$-acyloxy, $\beta$-hydroxy, and ketonic oxygen; $R_2$ is selected from the group consisting of hydrogen and hydroxy; and $R_3$ is selected from the group consisting of acetyl, bromoacetyl, chloroacetyl, and acyloxyacetyl; with at least about two molar equivalents of a tertiary-alkyl hypochlorite under substantially anhydrous conditions in the presence of an organic solvent at a temperature between about minus twenty and about plus fifty degrees centigrade to convert the 3-hydroxy group to a 3-keto group.

References Cited in the file of this patent
UNITED STATES PATENTS
2,403,683    Reichstein _____ July 9, 1946